June 25, 1968  A. W. WAKEMAN  3,390,097
FOAM PRODUCING AND DISPENSING DEVICE
Original Filed March 16, 1965  3 Sheets-Sheet 1
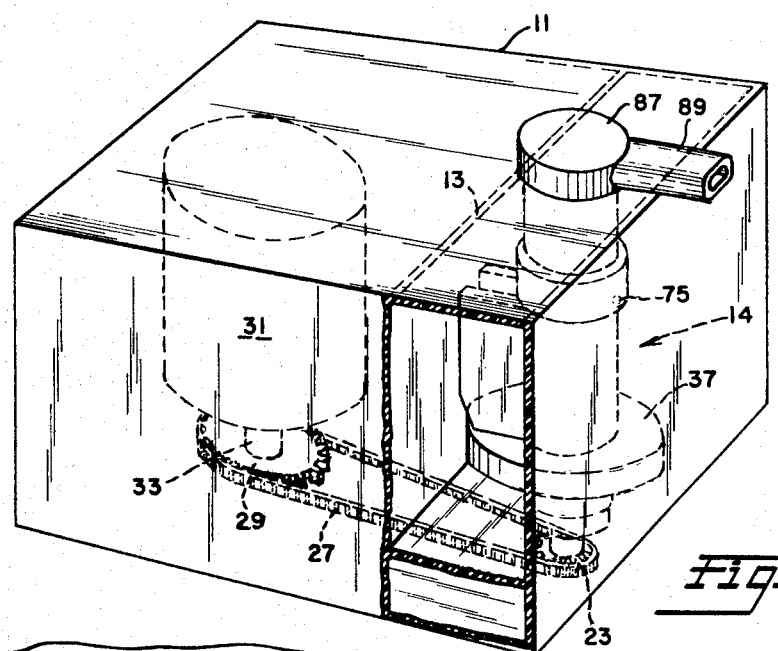
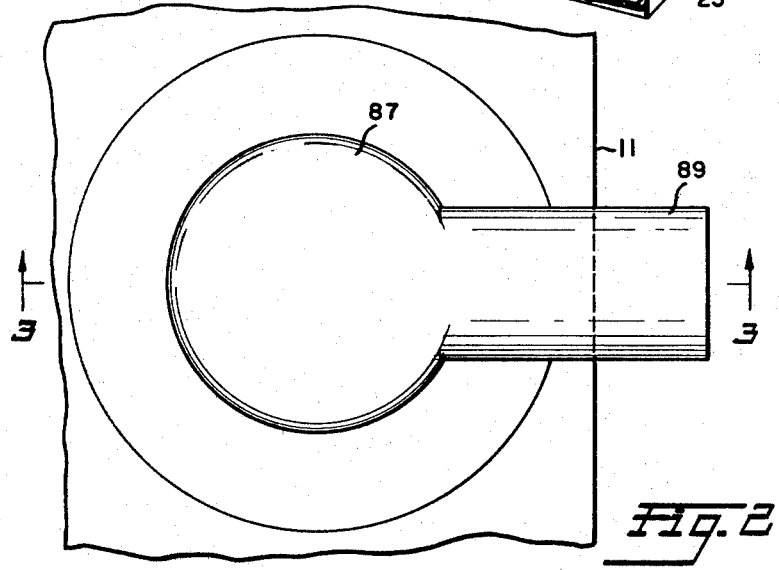
INVENTOR
ALFRED W. WAKEMAN

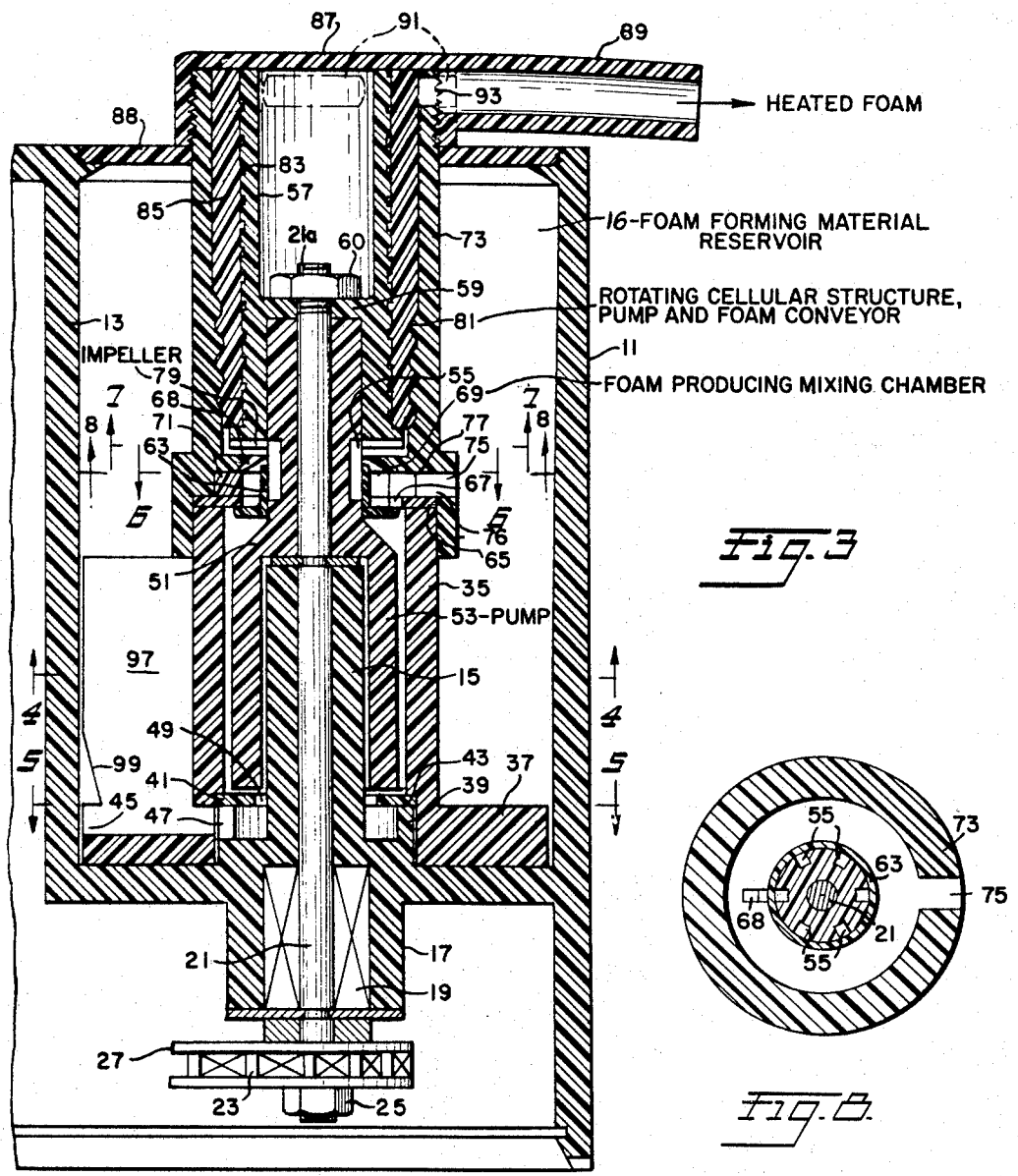

June 25, 1968   A. W. WAKEMAN   3,390,097
FOAM PRODUCING AND DISPENSING DEVICE
Original Filed March 16, 1965   3 Sheets-Sheet 3

INVENTOR

ALFRED W. WAKEMAN

United States Patent Office 3,390,097
Patented June 25, 1968

3,390,097
FOAM PRODUCING AND DISPENSING DEVICE
Alfred W. Wakeman, Durham, Conn., assignor to Dynamics Corporation of America, New York, N.Y., a corporation of New York
Original application Mar. 16, 1965, Ser. No. 440,152, now Patent No. 3,368,719, dated Feb. 13, 1968. Divided and this application Jan. 6, 1967, Ser. No. 623,156
3 Claims. (Cl. 252—359)

ABSTRACT OF THE DISCLOSURE

A foam producing and dispensing device wherein foam is created in a chamber and drawn upwardly through a rotatable body member having a cellular structure with interconnecting cells. The body member is in frictional contact with an internally threaded housing so that rotation of the body causes a pumping action and also produces sufficient friction to substantially raise the temperature of the foam.

---

The present application is a division of my copending application Ser. No. 440,152, filed Mar. 16, 1965, now Patent No. 3,368,719.

This invention relates to foam dispensing devices and more particularly to devices for generating and dispensing foam at elevated temperatures.

There are many types of foam dispensing devices available at the present time, with the most popular type of device being the well-known pressurized can type of dispenser. This type of device is, by its nature, usable only once after which time the container is discarded. This results in a relatively expensive product but worthwhile because of the convenience of the easy means for producing the foam.

In a number of applications it would be desirable to produce foam which is heated to a temperature above normal room temperature. The best known example of the use of heated foam is in the shaving lather field. None of the pressurized cans on the market today have a means independent of a time consuming and relatively slow outside heating source for raising the temperature of the foam dispensed therefrom.

Commercial foamers are available and are in extensive use in barbershops. However, while it may be practical for a commercial barber to use a heating element to maintain the liquid temperature of a solution and the produced foam at well above room temperature for an entire day, it is nevertheless true that these devices require approximately one-half hour to heat and several minutes to generate foam after standing overnight. Obviously, such a device would not be practical for a consumer to use in his own home where it would normally be used only once a day.

Accordingly, it is an object of this invention to provide a device for producing and dispensing foam at an elevated temperature.

It is a further object of this invention to provide such a device which is capable of producing foam at an elevated temperature substantially instantaneously without the need of an independent heating element.

Yet another object of this invention is to provide a device which will generate foam from a liquid soap by means of a motor driven pump and heat the foam by means of the friction generated during the rotation of the pump.

Still another object of this invention is to provide a device for generating and dispensing foam at an elevated temperature which is compact in size, relatively simple in operation, and which may be produced economically.

These and other objects of this invention will become apparent from the following description when taken in conjunction with the drawings wherein:

FIG. 1 is an illustrative view of the entire device with a section thereof broken away, and with the general internal mechanisms shown in phantom;

FIG. 2 is a partial plan view of the foaming device of FIG. 1;

FIG. 3 is a sectional view taken along the lines 3—3 of FIG. 2;

FIG. 8 is a sectional view taken along the lines 8—8 of FIG. 3.

Figure 4:
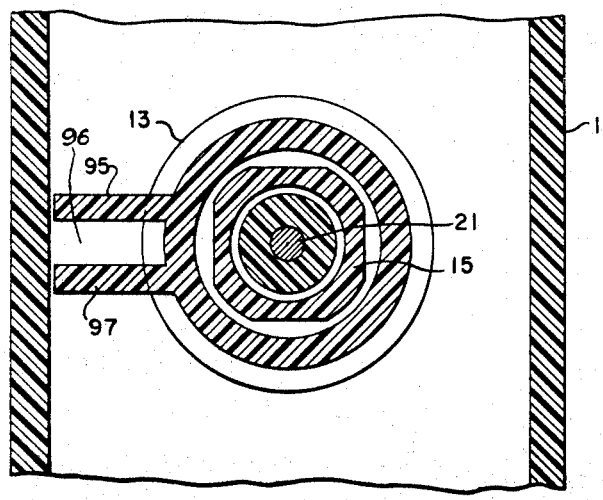
FIG. 4 is a sectional view taken along the lines 4—4 of FIG. 3.
Figure 6:
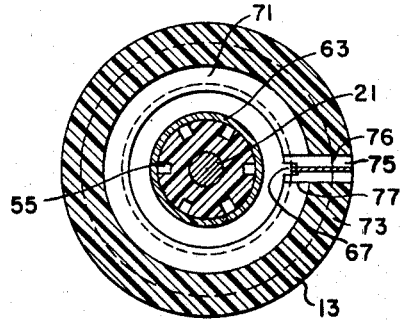
FIG. 6 is a sectional view taken along the lines 6—6 of FIG. 3.
Figure 5:
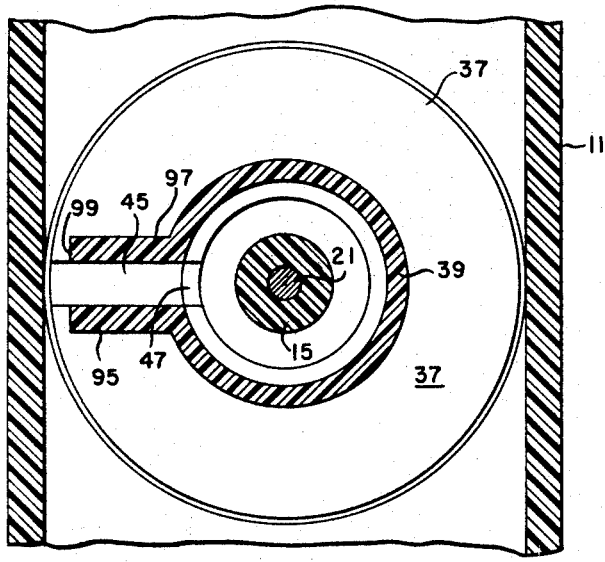
FIG. 5 is a sectional view taken along the lines 5—5 of FIG. 3.

Whereas the illustrative drawings and the subsequent description are directed to a device specifically designed for producing shaving lather, it is to be understood that this invention may be used for generating foam from many different types of liquid for various purposes.

Generally, the present device consists of a liquid reservoir having a pump housing therein which surrounds a rotatable pump means for pumping the liquid from the reservoir upwardly within the pump housing. The amount of fluid delivered from this lower pump housing is metered and mixed with air from an entrance port, thus generating a foam mixture. The foam is then forced upwardly into a passageway containing a body having a cellular structure with intercommunicating cells. This body is rotated together with the pump means and bears against an upper pump housing which is internally threaded. As a result, further air is drawn into the entrance port thus providing a continuous supply of foam and at the same time the friction of the cellular structure bearing against the upper housing elevates the temperature of the foam which may then be dispensed out of a spout or the like.

Turning now more specifically to the drawings, FIG. 1 generally shows an enclosure 11 which is suitably sized to contain therein a motor 31 and a pump assembly generally indicated at 14. The motor output is taken through shaft 33, chain 27 and sprocket 29 to the sprocket 23 of the pump 14 to provide the driving power therefor. The output of the pump is through the spout 89 which is secured to the pump by means such as a cap 87.

The details of the pump itself are illustrated in FIGS. 3 through 7. Part of the enclosure 11 has an integral wall 13 which creates a liquid reservoir 16 within the enclosure and within which the major portion of the pump 14 is enclosed.

Also integral with the enclosure 11 and the wall 13 are an upwardly extending cylindrical member 15 and a downwardly extending cylindrical member 17. A standard type bearing member 19 is enclosed within the cylinder 17 for providing the necessary support and bearing surface for the shaft 21 which extends upwardly from the sprocket 23 and through the upwardly extending cylindrical projection 15.

A lower pump housing 35 which may be cylindrical in configuration has a circular flange member 37 at the base thereof which rests at the bottom of the reservoir. An inner lip 43 of the lower pump housing bears against a reducing washer 41 which in turn rests upon a shoulder 39 also integral with the reservoir 13. A channel 45 is provided at one point in the flange 37 and extends from the outer circumference thereof inwardly across the flange as is more clearly seen in FIG. 5.

Channel 45 engages with a slot 47, which provides a passage to the circular opening 49 created between washer 41 and the cylindrical member 15, thus providing a passage for the fluid from the reservoir through the pump housing and the reducing washer 41 to the interior of the pump housing 35.

The actual pump for the present device includes both a lower pump 53, a mixing chamber 69 and an upper pump 57. As will be evident from FIG. 4, the lower pump 53 is essentially a centrifugal pump having a four-sided configuration with beveled corners which, when rotated, will pull the liquid out of the reservoir and upwardly to the top of the lower pump 53.

The upper pump member 57 has vertical cross-sectional H configuration and the center section 59 is secured to the upper end of the extending portion of the lower pump by means such as a nut 60 secured to the threaded end 21a of the shaft 21. Thus, both the lower pump 53 and the upper pump 57 rotate with the shaft 21.

The upper pump housing 73 rests upon a washer 65 which in turn abuts against the upper end of the lower pump housing 35. It should be noted that the upper pump housing, lower pump housing and washer 65 may be formed as one integral unit.

A flexible seal 63 is frictionally fitted about the upper portion of the lower pump 53 and extends outwardly into contact with the washer 65. The amount of fluid which passes from the lower pump housing to the upper pump housing is controlled by a notch 67 in the washer 65 which extends inwardly so as to allow the fluid to by-pass the seal 63. The lower pump pressure is controlled by the differential between the inside diameters of the washers 41 and 65.

As shown, the upper pump housing has a port 75 therethrough which matches with the opening 77 in a split washer 71 which, in turn, rests upon washer 65. Again, it will be obvious that this entire structure could be molded as an integral piece with the housing. The orifice 75 and the opening 77 in the split washer 71 provide an air passage into a mixing chamber 69 wherein the fluid passing through the metering notch 67 and the air entering from the passage mix and form a foam. This foam passes upwardly beyond the seal 63. If desired, a plurality of grooves 55 may be cut about the circumference of the upper portion of the lower pump 53 to aid in foam entrapment.

In order to assist in the discharge of excess fluid from the mixing chamber 69 and the simultaneous induction of air into the chamber when the device is first put into operation, a vertical rectangular vane 76 may be placed in the air passage. Vane 76 extends into chamber 69 and functions during the priming cycle, discussed below.

Figure 7:
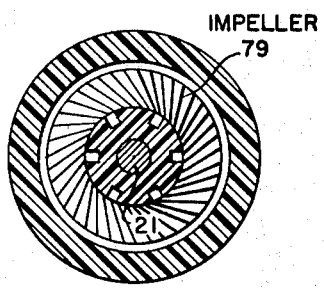
FIG. 7 is a sectional view taken along the lines 7—7 of FIG. 3.

Secured to the base of the upper pump member 57, or integral therewith, may be an impeller 79 more clearly shown in FIG. 7. This impeller would further aid in impelling the foam mixture outwardly and upwardly into the rotating body member 85. This body member has a cellular structure with intercommunicating cells and may be of many types of material, such as urethane foam or the like. Body member 85 is fitted about the upper pump member 57 and is retained thereon by a plurality of circular grooves 83. Body member 85 also extends outwardly and bears against the inner surface of the upper pump housing 73 which has an internal threaded portion 81. As stated above, upper pump housing member 73 is, in effect, integral with the lower pump housing 35 and remains stationary. This combination of the rotating body member 85 and the internally threaded fixed housing 73 draws the foam upwardly through the body member which, in turn, causes air to be drawn inwardly through port 75. Thus, a continuous foam production occurs in the mixing chamber.

Since the cellular body 85 is rotating with the shaft 21, friction is created between the inner surface of the fixed housing 73 and the body. Therefore, as the foam is forced through the cellular body, the heat developed by the friction elevates the temperature of the foam.

The device as shown in FIG. 3 is further provided with a priming means in order to assure proper operation even if the dispenser has not been used for a period of time. It will be noted that the notch 67 controls the amount of liquid which passes into the mixing chamber as explained above. Initially, this controlled amount of liquid is forced to the outer periphery of the mixing chamber before foam production begins. A priming slot 68 provides a passage in the extension of the upper housing in order that a small amount of this liquid may be passed upwardly into contact with the cellular body. The amount of liquid is controlled by the size of the slot so that enough liquid is passed to wet the body member 85 prior to the production of foam, but not enough to be discharged through the upper end of the sponge.

An exit port 93 in the upper pump housing 73 provides a means for the foam created to be dispensed outwardly from the pump. The spout 89 and the cap 87, which are threadably secured to upper housing 73 and rest upon lid 88, are formed with an elongated orifice 91, shown in phantom in two positions, so as to provide a means for reducing the orifice 93. Additionally, the orifice is elongated in order to provide a temperature control for the foam to be dispensed. If the entire orifice 93 is uncovered, then the foam will pass rapidly outwardly through the spout 89. However, if the size of the orifice 93 is reduced by rotation of the cap 87 and spout 89, the flow of the lather will be reduced because of the restricted opening. If the flow of the lather is restricted, it will remain within the cellular body 85 for a longer period of time and thus will be heated to a greater extent by the friction developed therein. The adjusted size of the orifice will also affect the particular consistency of the foam. Thus, if the size of the orifice is restricted, the foam produced will be both hotter and dryer than the foam produced with the orifice uncovered.

In order to assure proper flow of the liquid from the reservoir 16 into the lower pump housing, extending wall members 95 and 97 may be provided so as to form a sub-reservoir 96 above channel 45. Additionally, the members 95 and 97 are beveled at the lower ends thereof as at 99. When the pump is first started, if there is any hardened material, such as soap, near the channel 45, the first fluid which will be drawn into the orifice 47 will be down from between the extending members 95 and 97. This downward flow will tend to cause any residue to be pulled through the beveled portion 99 so as to mix thoroughly with the fluid and dissolve before there is any possibility that it could clog the pumping mechanism.

The motor may be controlled by any type of on-off switch (not shown) so as to provide a convenient means for controlling the dispensing of the foam.

It will now be seen that the present invention provides a unique device for creating and dispensing foam and raising the temperature of the foam without independent heating units. It is to be understood that the drawings and description are illustrative only and that the use of various modifications of the components shown and described would not depart from the scope of the invention.

I claim:

1. A device for dispensing foam comprising,
   a liquid reservoir,
   a foam chamber within a container,
   means in said chamber for mixing liquid from said reservoir and air in said chamber so as to produce foam therein,
   an exit port,
   a friction producing means comprising a rotatable body having a cellular structure with interconnecting cells connecting said chamber and said exit port and a closely confining body in contact with the outer surface of said cellular body for substantially elevating the temperature of foam passing therethrough.

2. A method for dispensing foam at an elevated temperature from an enclosing chamber which comprises,
producing foam,
passing said foam through a rotatable body having a cellular structure with interconnecting cells, said body being in frictional, heat generating contact with another closely confining surface, and
dispensing said heated foam from said body outwardly of said enclosing chamber.

3. A method for producing heated foam which comprises, providing a source of friction heat by creating friction between a fixed, closely confining surface and a rotatable cellular structure having interconnecting cells and passing foam through said source for producing said heated foam.

References Cited

UNITED STATES PATENTS

| | | | |
|---|---|---|---|
| 2,122,636 | 7/1938 | Cantrell | 252—359.5 |
| 2,344,170 | 3/1944 | Rolstad et al. | 252—359.5 |
| 2,756,102 | 7/1956 | Switzer | 252—359.5 |
| 2,919,837 | 1/1960 | Rolstad | 252—359.5 X |
| 3,215,642 | 11/1965 | Levy | 252—359.5 |

NORMAN YUDKOFF, *Primary Examiner.*

J. SOFER, *Assistant Examiner.*